June 25, 1935.  K. W. CONNOR  2,006,159
METHOD OF MACHINING CYLINDERS
Filed Sept. 28, 1934   2 Sheets-Sheet 1
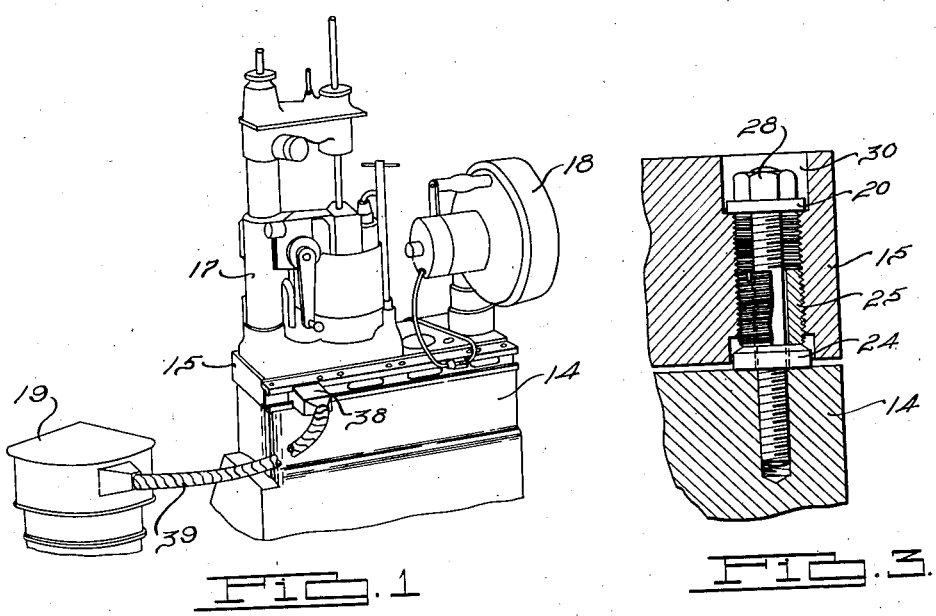
FIG. 1.   FIG. 3.
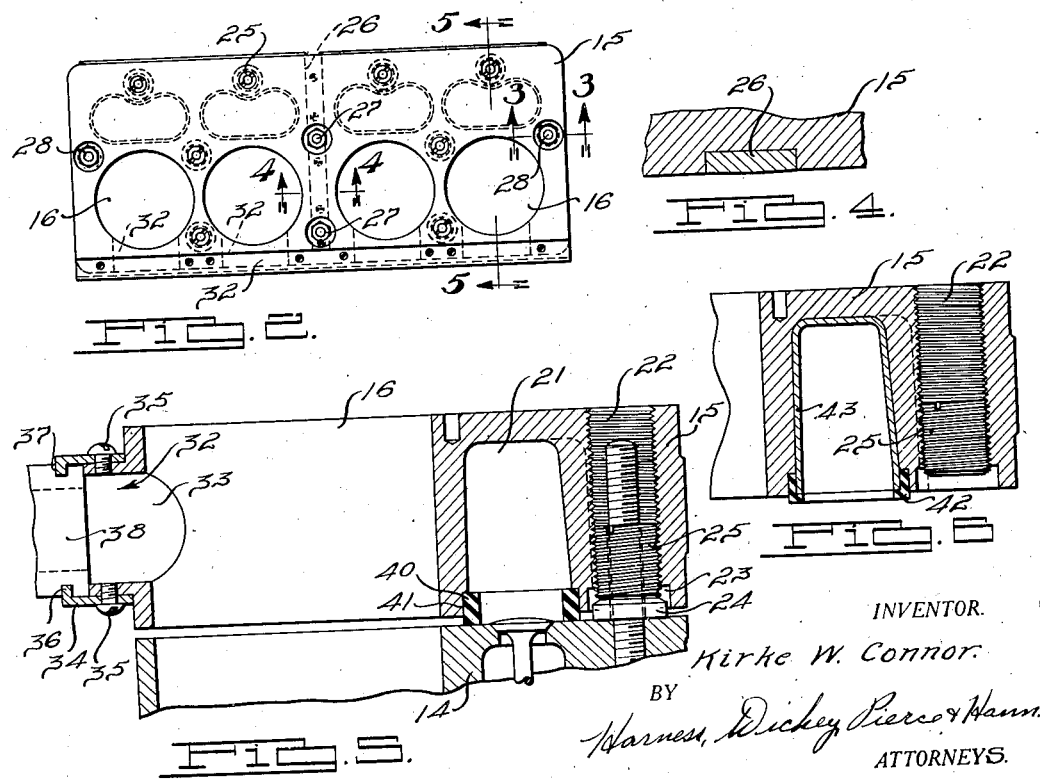
FIG. 2.   FIG. 4.
FIG. 5.   FIG. 6.
INVENTOR.
Kirke W. Connor.
BY
Harness, Dickey, Pierce & Hann.
ATTORNEYS.

June 25, 1935.  K. W. CONNOR  2,006,159
METHOD OF MACHINING CYLINDERS
Filed Sept. 28, 1934  2 Sheets-Sheet 2
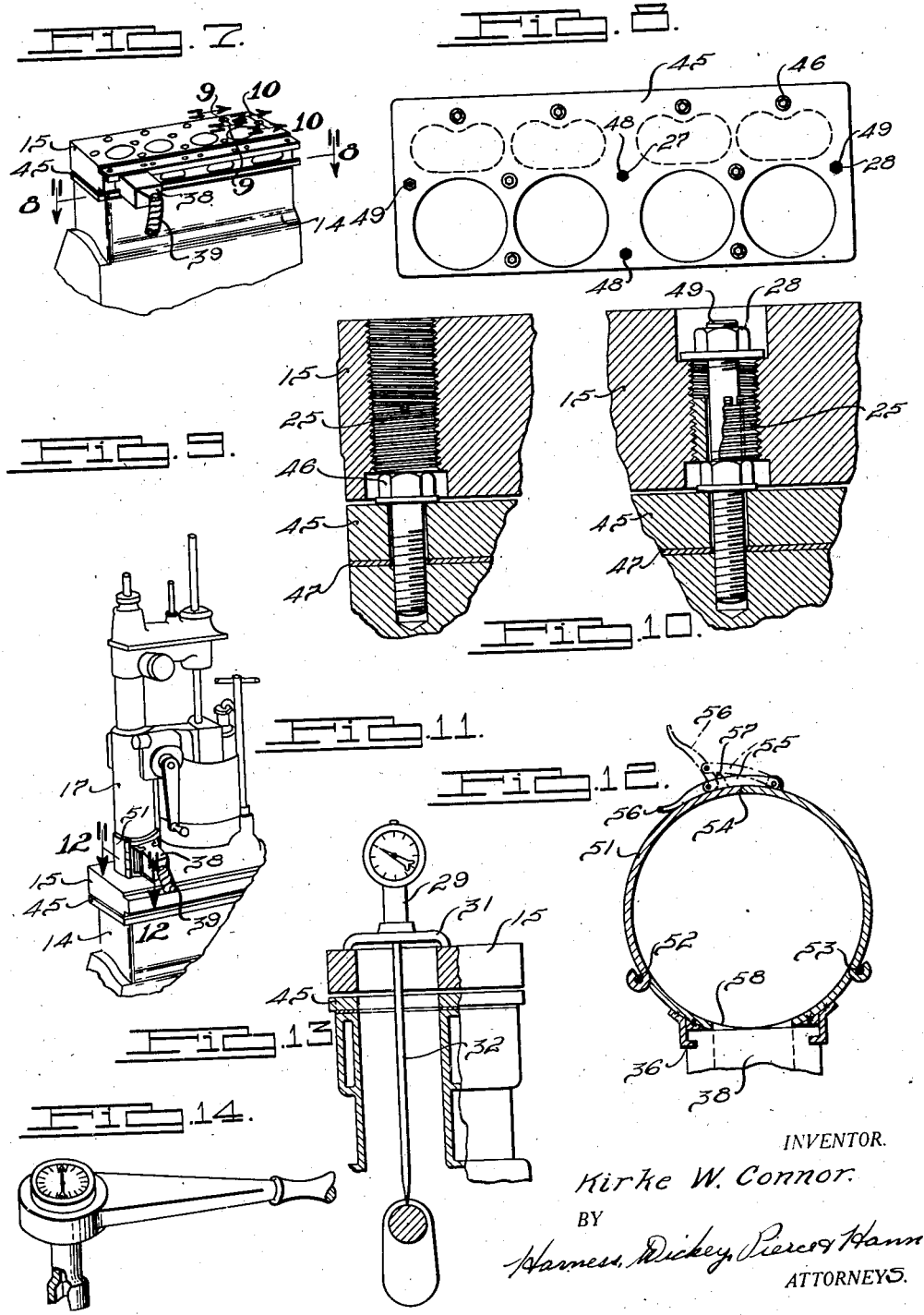
INVENTOR.
Kirke W. Connor.
BY
Harness, Dickey, Pierce & Hann.
ATTORNEYS.

Patented June 25, 1935

2,006,159

UNITED STATES PATENT OFFICE 2,006,159

METHOD OF MACHINING CYLINDERS

Kirke W. Connor, Detroit, Mich., assignor to Micromatic Hone Corporation, a corporation of Michigan Application September 28, 1934, Serial No. 745,883

16 Claims. (Cl. 51—278)

This invention relates to method and means of machining automobile cylinders or the like and in particular to a method and means for correctly positioning the cylinder boring or grinding tool relative to the axis of the crank shaft bearing and of producing, during the machining of said cylinders, stresses in the cylinder block which are substantially identical with those produced by a properly secured cylinder head.

In my copending application Serial No. 690,673 filed September 23, 1933, I have disclosed a method and means for stressing the cylinder and aligning the cylinder machining tool relative to the axes of the crank shaft bearings. Some difficulty was experienced when applying a predetermined stress to the cylinder block relative to the leveling plate when the stressing plate was not made sufficiently thick to prevent its deflection which in some instances would cause the misalignment of the cylinder machining tool relative to the axes of the crank shaft bearings.

In practicing my present invention I have improved the foregoing construction by securing the clamping plate, employed to stress the cylinder block, independent of the leveling plate which is disposed thereabove so that each may be adjusted independent of the other. The leveling plate may then be constructed without reference to excess strength required to prevent the deflection of the plate, as in the foregoing construction. Further novelty resides in the construction of the leveling plate so that it may be employed independent of the stressing plate, which latter may be also employed independent of the former. The leveling plate may be provided with gaskets which seal the opening about the valves and valve ports so that a machining operation may be effected on the cylinders without any danger of the material being blown into the intake and exhaust ports of the engine block. An adapter on an end of a conductor is capable of being attached directly to the leveling plate adjacent to any one of a plurality of openings and to the tool when the stressing plate alone is employed having no manifold provided thereon.

Accordingly, the main objects of my invention are: to provide a plate having apertures which mate with the apertures in the cylinder block and which may be secured to the block in the same manner and with substantially the same force as the cylinder head therefor; to provide a plate having apertures corresponding to those of the cylinder block and adjustably supported on said block to be leveled relative to the axis of the crank shaft; to provide a pair of plates having apertures corresponding to those of an engine block and disposable on said block with one plate stressed in the same manner as a cylinder block head will be stressed when attached thereto, with the plate disposable thereon adjustable to have its surface parallel to the axis of the crank shaft bearing; to provide sealing means for the leveling plate which seals the port of the engine block from the cylinders thereof; to provide a manifold for the leveling plate having apertures communicating with the cylindrical openings thereof; to provide an adapter attachable to the manifold of the leveling plate and also securable to the cylinder machining tool when the leveling plate is not utilized and, in general, to provide methods and means for machining cylinder walls to insure a true cylindrical form when the block is stressed after the cylinder head is attached thereto with the cylinders disposed normal to the axes of the crank shaft bearings, all of which is simple in attachment and economical of use.

Other objects and features of novelty of my invention will be either specifically pointed out or will become apparent when referring, for a better understanding of my invention, to the following description taken in conjunction with the accompanying drawings, wherein:

Figure 1 is a perspective view of a cylinder block of an internal combustion engine having a leveling plate thereon with cylinder machining apparatus provided in combination therewith, Fig. 2 is an enlarged plan view of the leveling plate illustrated in Fig. 1, Fig. 3 is an enlarged broken sectional view of the structure illustrated in Fig. 2, taken on the line 3—3 thereof, Fig. 4 is an enlarged broken sectional view of the structure illustrated in Fig. 2, taken on the line 4—4 thereof, Fig. 5 is an enlarged sectional view of the structure illustrated in Fig. 2, taken on the line 5—5 thereof, Fig. 6 is a broken view of the plate illustrated in Fig. 5, showing a modified form thereof, Fig. 7 is a perspective view of an engine block having a stressing and leveling plate mounted thereon, Fig. 8 is an enlarged sectional view of the structure illustrated in Fig. 7, taken on the line 8—8 thereof, Fig. 9 is an enlarged broken sectional view of the structure illustrated in Fig. 7, taken on the line 9—9 thereof, Fig. 10 is an enlarged broken sectional view of the structure illustrated in Fig. 7, taken on the line 10—10 thereof, Fig. 11 is a view of structure, similar to that illustrated in Fig. 1, showing a modified form thereof, Fig. 12 is an enlarged sectional view of the structure illustrated in Fig. 11, taken on the line 12—12 thereof, Fig. 13 is a view, partly in section and partly in elevation, of a cylinder block having stressing and leveling plates thereon illustrated with a gauge employed therewith, and Fig. 14 is a broken perspective view of a pressure indicating wrench which may be employed to stress the plate illustrated in Figs. 9 and 10.

Referring to Fig. 1, a cylinder block 14 is disclosed with the cylinder head thereof removed. A leveling plate 15 having apertures 16 therein is mounted on the block 14 secured and leveled thereon to have the top surface parallel to the axis of the crank shaft bearings of the cylinder block. The leveling plate 15 supports the machine element 17, herein illustrated as a boring bar, and which, as is well known, may be a honing tool or other well known tool element. A motor driven blower 18 is shown disposed upon the plate in an aperture 16 thereof for the purpose of delivering a flow of air under pressure within the cylinder block 14 which is closed at the bottom by the cylinder block pan. All of the cylinders are sealed except the one which is being machined so as to provide a flow of air under pressure outwardly therethrough. A conduit having an adapter thereon, hereinafter to be described, directs the air blown from the cylinder being machined into a dust collector 19. The construction and operation of the grinding and boring machine 17, blower 18 and dust arrester 19 are disclosed in the inventor's Patent Number 1,934,226, issued November 7, 1933. Suitable sealing means for the cylinders are illustrated and described in the immediately above set forth application. A leveling and clamping plate combination is also disclosed in the inventor's co-pending application first above mentioned, over which the present method and structure is an improvement.

The leveling plate is more clearly disclosed in Figs. 2 to 5, inclusive, as comprising a casting having the cylindrical apertures 16 therein which align with the cylinders of the engine block 14. The cylinders 16 are preferably slightly larger than the cylinders to be ground so that the machining or dressing tool will not contact the wall thereof. A plurality of cored holes 21 are provided in the under face of the leveling plate of such shape as to encompass the pairs of valves and port openings for each cylinder. A plurality of threaded apertures 22 are likewise provided in the plate to receive the studs of the cylinder block which project therein. The ends of the apertures are shouldered at 23 for receiving washers 24 which are disposable over the studs and which are preferably provided with an arcuate surface to be mated with an arcuate surface provided on leveling nuts 25 which are screwed on the threads of the apertures 22. Transversely disposed across the under face of the leveling plate, medially of the ends, a bar 26 is provided, illustrated in Fig. 4, which projects slightly therebelow and about which the leveling plate 15 may be rocked. Through the adjustment of the nuts 25 the plate is rocked longitudinally of its length about the bar 26 for the purpose of aligning its top surface parallel to the axes of the crank shaft bearings. This is important so as to have the machining tool 17 positioned to dress the cylinders accurately, perpendicular to the axes of the crank shaft bearings to prevent the cocking of the piston normal to the connecting rod throw to thereby eliminate any unnecessary friction and wear between the cylinder walls and the pistons. A pair of nuts 27 are employed upon the cylinder block studs at the center thereof aligned with the bar 26 while a similar pair of nuts 28 are disposed over the end studs after the leveling plate 15 is accurately leveled to retain the plate in leveled position.

In Fig. 13, I have illustrated a leveling gauge 29 having a base 31 which engages the surface of the leveling plate 15. A dial actuating finger 32 extends into the cylinder in communication with the bearing of the crank shaft. A reading is taken in the cylinder at one end of the cylinder block and a like reading is taken in the cylinder at the opposite end of the cylinder block. The plate is thereafter leveled and readings taken until the same reading is obtained at both ends of the block. It is then known that the surface of the leveling block is actually in parallel relation to the axis of the crank shaft bearings. Thereafter the end nuts 28 may be tightened to hold the leveling plate on the block without stressing it to such an extent as to deflect the plate and cause it to move out of its parallel position. This may be checked thereafter to make certain that the same readings are still obtained at both ends of the block.

The boring or grinding machine 17 is then secured on the leveling plate 15 over the cylinder to be machined and the machining operation effected in a similar manner to that described in the above mentioned applications. That is to say, during the time air is delivered under pressure into the cylinder block to pass out through the cylinder being machined to prevent any of the dust or residue from falling into the cylinder block. Referring to Fig. 3, it will be noted that the apertures 23 in the center of the leveling plate 15 and at the ends thereof have a shoulder 30 for receiving the washers 20 upon which the nuts 27 and nuts 28 are screwed for retaining the plate in level position, holding the nuts 25 upon the washers 24 under the proper degree of tension.

Referring to Fig. 5, I have illustrated the leveling plate 15 as being provided with a manifold extension 32 having apertures 33, one communicating with each of the cylinders 16 of the plate. Angle-shaped strips 34 are retained by screws 35, or other suitable means, to the manifold, the extensions 36 thereof engaging slots 37 in an adapter 38 which forms a seal with an aperture 33. The adapter is movable along the manifold 32 to be disposed adjacent to any of the apertures 33 thereof. As illustrated in Fig. 1, the adapter 38 is connected by a tube 39 to the dust arrester 19 for conducting the flow of air and the machining residue into the arrester.

As also illustrated in Fig. 5, the cored openings 21, for providing clearance for the valves of the cylinder block, may have a sealing element 40 provided in a shoulder 41 at the mouth of the openings 21 to project slightly beyond the lower face of the plate. The element is made of felt, rubber, or like resilient material which will seal an area about the valves and valve openings to prevent the dust and residue from the machining operation from being blown into the intake and exhaust ports of the cylinder block. Since the elements are resilient, they will not interfere with the leveling of the plate and a proper seal will always be provided thereby.

In Fig. 6, I have shown a slightly modified form of structure wherein a sealing element 42 is sealed directly to an adapter 43 which is disposable within the openings 21 to form a renewable sealing element which encompasses the intake and exhaust ports of the cylinder block to effectively seal them against the entrance of air and residue from the machining operation the same as effected by the sealing element illustrated in Fig. 5. The novelty of the construction shown in Fig. 6 resides in the renewability of the adapter which may or may not be employed, as desired, and which, when the sealing material wears out or becomes damaged, may be readily replaced.

In Figs. 7 to 10, inclusive, I have illustrated a further extension of my invention, embodying the employment of the stressing plate 45 in combination with the leveling plate 15. The stressing plate is employed to provide the same stress to the cylinder block as would occur when the cylinder head is tightened thereon. The required amount of pressure to be applied to the bolts of the cylinder head to retain the gasket in sealed relation against the pressure developed during the engine operation is first ascertained. I have illustrated a wrench in Fig. 14 which may be employed to ascertain this loading of the nuts. The plate 45 is then placed upon the block, after the studs thereof have been removed, and bolts 46 utilized for applying the same stress to the block by tightening the nuts with the predetermined pressure ascertained as above pointed out. The stressing plate 45 has substantially the same apertures as those above set forth for the leveling plate 15 including the recessed apertures similar to aperture 21 for receiving the valve and sealing the valve ports.

A gasket 47 is preferably employed between the block and the plate 45 to exactly simulate the condition when the head is disposed thereon. It may be desirable to employ a gasket outlined the same as the plate in Fig. 8 for the purpose of sealing the openings between the cylinders and the intake and outlet ports which would otherwise be present. Such a gasket would prevent any of the dust or residue from the machining operation from being blown into the exhaust port as is desirable. A suitable resilient sealing strip may be employed to seal the passage which is present when the engine gasket is utilized. The leveling plate 15 may then be disposed on top of the stressing plate 45 in the same manner as specified hereinabove with regard to the structure illustrated in Figs. 1 to 6, inclusive.

In this instance the nuts 25 are secured down directly upon the top of the bolts 46 and the leveling is effected in this manner. When the leveling plate is employed, two central studs 48 are left in the block along with two end studs 49 upon which the nuts 27 and 28 are screwed for retaining the leveling plate in leveled position. This construction has the advantage over that described in the above mentioned co-pending application, by reducing the strength required in the leveling plate since the stressing of the block is effected independent thereof. In the above mentioned application, the clamping took place after the plate was leveled and, as pointed out above, when a thin leveling plate was utilized there was danger of stressing the plate so that it would be deflected out of parallelism with the axis of the crank shaft bearings.

In Figs. 11 and 12, I have shown a further form which my invention may assume when the manifold 33 is not provided on the leveling plate 15 or when the stressing plate 45 is employed alone. In this construction, a collar 51 encompasses the bottom of the tool-supporting housing to seal it to the top of the plate about the cylindrical aperture 16. The collar is hinged at 52 and 53 so that it may be readily disposed about the housing having complementary end portions 54 which retain the ends in aligned relation. A clamping element is carried by one of the hinge portions comprising a pivoted link 55 and a latch 56 the end of which projects under a lug 57 provided on the opposite hinge element.

The opposite side of the collar is provided with an aperture 58 having projecting lugs 36 provided thereabout with which the adapter 38 mates in the same manner as it mated with the manifold 32 above described, to be sealed with the aperture 58 to form a passage therefrom to the dust arrester 19. The assembly of the collar is effected through the sliding of the two hinge ends on either side of the housing and after moving the ends 54 into abutted relation, they are retained in clamped position through the engagement of the handle 56 and the lug 57. The adapter 38 is then secured onto the projections 36 and in this manner the tool is completely sealed with the leveling plate.

It is to be understood that the stressing plate may be employed alone, secured by a plurality of bolts 46 to provide the desired stress to the cylinders with the machining tool secured directly to the plate. When the tool is to be secured on the plate the studs may project therethrough to form anchoring means for the tool and the stress applied through the tool and plate to provide the desired stress to the cylinder block.

When the leveling plate is employed, assurance is had that the machining tool is disposed to machine a cylinder exactly perpendicular to the axis of the crank shaft bearings and that no cocking of the pistons relative to the axis of the crank shaft bearings and the throw of the connecting rod will occur. When the stressing plate is employed, assurance is had that the cylinders will be exactly round when the cylinder head is screwed upon the cylinder block. When both plates are employed not only are the cylinders exactly round when the cylinder head is screwed on the block, but such cylinders are disposed directly perpendicular to the axis to the crank shaft bearing. This construction provides a tight seal between the cylinders and the piston rings and undue friction, present when the pistons and the connecting rods are cocked relative to the cylinders, is entirely eliminated.

In practice, when employing a stressing plate it was found that after the cylinders had been accurately machined and the plate removed, the pistons could not be pushed into the cylinders due to the warping of the cylinder walls when the stressing plate was removed. The plate was again screwed upon the head with a predetermined pressure, whereupon the pistons readily fitted within the cylinders and were then attached by the connecting rods to the crank shaft. Upon the removal of the plate it was impossible to turn the crank shaft due to the freezing of the pistons within the warped cylinders. After the cylinder head was placed upon the cylinder block and screwed thereon under predetermined pressure, the pistons were released and the crank shaft could then be turned. From this practical demonstration, the necessity and practicability of my invention was readily apparent.

While I have described and illustrated but a single embodiment of my invention, it will be apparent to those skilled in the art that various changes, omissions, additions and substitutions may be made therein without departing from the spirit and scope of my invention, as set forth in the accompanying claims.

I claim as my invention:

1. The method of machining cylinders of an engine block which includes the steps, of stressing the block to simulate the stresses set up therein when the cylinder head is clamped thereon, thereafter leveling a support for the machining tool parallel to the axis of the crank shaft bearings, securing the tool on said support, and machining the cylinders thereafter.

2. A leveling plate adapted to be employed on the top of an engine block having at least one cylinder, means for adjusting the plate on said block to have the top surface thereof parallel to the axis of the crank shaft bearings, and a tool supported on said plate for machining said cylinders.

3. A leveling plate disposable on the top surface of an engine block having at least one cylinder therein, means for leveling said plate to be parallel to the axis of the crank shaft bearings of the block, a manifold on the side of the plate communicating with apertures therein aligned with said cylinder and through which the machining is effected, and an adapter securable to said manifold adjacent to any of said apertures.

4. The combination of a leveling plate for providing a surface parallel to the axis of the crank shaft bearings of an engine block, said plate having a plurality of apertures aligned with the cylinders of the block, a plurality of additional apertures in said block aligning with a plurality of the stud receiving holes in the engine block, a laterally disposed rocking bar projecting from the lower surface of said plate, and means in said plate for adjusting it about said bar.

5. The combination of a leveling plate for providing a surface parallel to the axis of the crank shaft of an engine block, said plate having a plurality of apertures aligned with the cylinders of the block, and a plurality of additional apertures aligning with a plurality of the stud receiving holes in said block, means for leveling the plate on the block, recesses in said plate disposable over the valve ports of the block, and sealing means about the edges of said recesses for sealing the ports from the cylinders.

6. The combination of a leveling plate for providing a surface parallel to the axis of the crank shaft of an engine block, said plate having a plurality of apertures aligned with the cylinders of the block, and a plurality of additional apertures aligning with a plurality of the stud receiving holes in said block, means for leveling the plate on the block, recesses in said plate disposable over the valve ports of the block, receivable elements disposable in said recesses, and sealing means on said elements for sealing the ports from the cylinders.

7. A plate having a plurality of apertures aligned with the cylinders of the block and a plurality of additional apertures aligned with a plurality of stud receiving holes in said block, a cylinder machining tool secured to said plate in position to machine a cylinder, means for sealing said tool to said plate to form a passage for air with said cylinder, said passage having an exhaust aperture, projecting flanges adjacent to said aperture, and a conducting adapter provided with slots engageable with said flanges to seal the adapter about said aperture.

8. The method of machining cylinder blocks or the like, including the steps, of mounting a stressing plate on the cylinder block in the position usually occupied by a cylinder head, drawing the plate on said block to stress the block in the same manner as it is stressed when said head is drawn thereon, mounting a leveling plate on said stressing plate, leveling said plate parallel to the axis of the crank shaft bearings, and machining said cylinders when so stressed.

9. The method of machining cylinder blocks or the like, including the steps, of mounting a stressing plate on the cylinder block in the position usually occupied by a cylinder head, drawing said plate on said block to stress the block in the manner as it is stressed when the cylinder head is drawn thereon, mounting a leveling plate on said stressing plate, leveling said plate to be parallel to the axis of the crank shaft bearings, mounting a tool on said leveling plate to be normal to said axis of the crank shaft bearings, and machining said cylinders while so stressed.

10. The combination employed during a cylinder machining operation of a cylinder block, a stressing plate having apertures aligned with cylinders of the block and clamping stud holes of the block, of a gasket disposed between the plate and the block, means for drawing said plate and gasket on the block with substantially the same pressure as would be applied by a cylinder head when the cylinder head is attached to the block, a leveling plate disposed on top of said first plate, and means for leveling said second plate to have the top surface parallel to the axis of the crank shaft bearings.

11. The combination employed during a cylinder machining operation of a cylinder block, a stressing plate having apertures aligned with cylinders and clamping stud holes of the block, of a gasket disposed between the plate and the block, means for drawing said plate and gasket on the block with substantially the same pressure as would be applied by a cylinder head when the cylinder head is attached to the block, a leveling plate disposed on top of said first plate, means for sealing said leveling plate onto said first plate about the valve port of the block, and means for leveling said plate to have the surface thereof parallel to the axis of the crank shaft bearings.

12. A leveling plate adapted to be employed on the top of a cylinder block provided with recesses which extend over the valves in the cylinder block, means for adjusting the plate on said block to have the top surface thereof parallel to the axis of the crank shaft bearings, and sealing means on said plate for sealing the valves of the block relative to the top surface of the block, and a tool supported on said plate for machining said cylinders.

13. A stressing element employed on an engine block during a cylinder machining operation, including a plate having apertures aligned with the valve and clamping stud holes of the engine block, a gasket disposed between said plate and block, bolts extending through said apertures in the plate and screwed into the stud holes for clamping the plate and gasket to the block and exerting substantially the same pressure as would be applied by a cylinder head when the cylinder head is attached to the block, a leveling plate disposable on top of said first plate, sealing means on said leveling plate for sealing the valve opening in said first plate, means for leveling said leveling plate on said first plate to have the surface thereof parallel to the axis of the crank shaft bearings, and a machine tool supported on said leveling plate for machining said cylinders.

14. A leveling plate employed relative to the top surface of an engine block and provided with a plurality of cylindrical apertures in aligned relation with the cylinders of the block, said plate having additional apertures communicating with said first apertures, means adjacent to said last apertures for sealing a conduit to said apertures, and means for leveling and securing said plate to said block.

15. A leveling plate employed relative to the top surface of an engine block provided with a plurality of cylindrical apertures in aligned relation with the cylinders of the block, said plate having additional apertures communicating with said first apertures, means adjacent to said last apertures for sealing a conduit to said apertures, and means for leveling and securing said plate to said block, said plate having recesses for extending over a valve in said block.

16. A leveling plate employed relative to the top surface of an engine block provided with a plurality of cylindrical apertures communicating with said cylinders in said block, said plate having additional apertures communicating with said first apertures, means adjacent to said last apertures for sealing a conduit to said apertures, means for leveling and securing said plate to said block, said plate having recesses for extending over a valve in said block, and sealing means on said plate for sealing the valve relative to the surface of the block.

KIRKE W. CONNOR.